Patented Oct. 13, 1936

2,057,283

UNITED STATES PATENT OFFICE 2,057,283

PROCESS FOR THE MANUFACTURE OF ALCOHOLS

Adrianus Johannes van Peski and Siegfried Leonard Langedijk, Amsterdam, Netherlands, assignors to Shell Development Company, San Francisco, Calif., a corporation of Delaware No Drawing. Application December 31, 1934, Serial No. 760,021. In Great Britain May 23, 1929

12 Claims. (Cl. 260—156)

Our invention relates to a process for the manufacture of alcohols by converting olefines into the corresponding alcohols by means of water.

It is already known to prepare ethyl alcohol by combining ethylene with water according to the equation $$C_2H_4 + H_2O \longrightarrow C_2H_5OH$$

It is also known to perform the aforesaid reaction in the liquid phase by absorbing the olefine in sulphuric acid and thereafter converting the sulphuric ester obtained into alcohol. It has further been proposed to carry out the hydration process mentioned above in the vapor phase under high pressure and in the presence of catalysts.

We have now found that the hydration of olefines may be effected even at ordinary pressures and with satisfying yields, if the reactions are carried out in the presence of certain catalysts.

According to our invention, the hydration process is effected at a temperature of at least 100° C. by combining one or more olefines with water in the vapor state in the presence of a metal compound, other than oxides, of cobalt, chromium, vanadium, and/or tungsten, which compounds do not yield the metal under reaction conditions. Metal salts of their weak inorganic acids may be sometimes used to great advantage as catalysts. Salts of this type are, for instance, bismuth vanadate and copper vanadate. It is sometimes advantageous to employ mixtures of any of the above-mentioned compounds, other than oxides, which do not yield the metal under reaction conditions with or without free cobalt, chromium, vanadium, tungsten and/or oxides or those compounds thereof which yield the metal under reaction conditions. Very good results are obtained when ethylene is hydrated as described in the presence of a mixture of anhydrous tungstic acid ($H_2WO_4$) and iron oxide or platinum, gold, or copper or tantalum or bismuth vanadate. Mixtures of anhydrous tungsten oxide and copper vanadate are very suitable catalysts for the hydration of propylene.

The above-mentioned compounds, other than oxides, of cobalt, chromium, vanadium and tungsten which do not yield the metal under reaction conditions may be employed with one or more metals and/or metal compounds of the platinum group or of gold, silver, copper, iron, nickel and tantalum.

The catalysts used according to our invention are preferably used in a finely divided state, for instance finely divided on a suitable carrier such as porous substances, e. g. silica gel, pumice stone, active carbon, phosphates, pyro-phosphates, alum earths and the like.

The catalysts according to our invention may also be used together with small quantities of promoters.

The following examples serve to illustrate how our invention may be carried into effect:

| Catalyst | Temperature catalyst ° C. | Liters of $C_2H_4$ passed through | Velocity in liters per hour | Milligrams of alcohol titrated in condensate |
|---|---|---|---|---|
| 7.5 g. copper-vanadate on 150 cc. pumice stone. | 140-150 | 3.5 | 0.5 | 36 |
| 5 g. bismuth vanadate on 100 cc. pumice stone. | 300 | 1.5 | 0.75 | 50 |

| Catalyst | Temperature catalyst ° C. | Liters of $C_3H_6$ passed through | Velocity in liters per hour | Milligrams of isopropyl alcohol titrated in condensate |
|---|---|---|---|---|
| 5 g. bismuth-vanadate on 100 cc. pumice stone. | 260 | 3 | 1 | 50 |
| 7.5 g. copper-vanadate on 150 cc. pumice stone. | 300 | 0.8 | 0.4 | 55.5 |
| Silver vanadate on 150 cc. pumice stone. | 300 | 3 | 1 | 36.3 |
| 10 g. tungstic acid ($H_2WO_4$) on 200 cc. activated coal. | 300 | 4.15 | 1 | 25.5 |

In all these experiments ethylene or propylene was led through water kept at about 100° C. and the resulting mixture of olefine and water vapor was then passed over the catalyst heated to the required temperature. The issuing gas was cooled and in the resulting condensate the presence of alcohol was proved by a positive iodoform reaction, the quantity being in most cases determined by titration with a $CrO_3$ solution.

It is possible that, when working with the catalysts according to our invention, a certain amount of aldehydes or ketones may be formed, owing to the dehydrogenating action of the catalysts on the alcohols which are the chief products. By a suitable choice of gas velocity and temperature, the formation of ketones and aldehydes may be promoted or avoided.

It should be observed that it is a highly important and new feature of the process according to this invention that it allows the manufacture of alcohols direct from olefines and water at ordinary pressure due to the high activity of the catalysts used. Up till now the hydration of olefines could only be effected under high pressure notwithstanding certain catalysts being employed, which of course made it necessary to use expensive apparatus and rendered the process uneconomical in comparison with the process of this invention which may be carried out under ordinary pressure.

It should be understood, however, that our invention is not limited to the application of normal pressure, but that also a higher pressure may be used, if desirable.

In consequence of the high activity of the catalysts which are employed according to our invention, it is also possible to perform the reaction at a considerably lower temperature than usual in the hitherto known processes of this kind.

It should be further understood that our invention comprises the conversion of other olefines as well as ethylene such as propylene, butylene and the like and also the conversion of olefines containing two or more double bonds in the molecule into the corresponding alcohols.

This invention is a continuation-in-part of our application, Serial No. 453,403, filed May 17, 1930.

We claim as our invention:

1. A method of manufacturing alcohol by hydrating the corresponding olefine having at least one double bond in the molecule which comprises combining the olefine with water in the vapor state at a temperature of at least 100° C. in the presence of at least one hydrating catalyst consisting essentially of a compound of the class consisting of the inorganic acids and inorganic acid salts which contain a metal of the group consisting of cobalt, vanadium, chromium and tungsten in the acid radical.

2. A method of manufacturing alcohol by hydrating the corresponding olefine having at least one double bond in the molecule which comprises combining the olefine with water in the vapor state at a temperature of at least 100° C. in the presence of an inorganic salt of an acid which contains a metal of the group consisting of cobalt, vanadium, chromium and tungsten in the acid radical.

3. A method of manufacturing alcohol by hydrating the corresponding olefine having at least one double bond in the molecule which comprises combining the olefine with water in the vapor state at a temperature of at least 100° C. in the presence of a metal salt of an inorganic acid which contains a metal of the group consisting of cobalt, vanadium, chromium and tungsten in the acid radical.

4. A method of manufacturing alcohol by hydrating the corresponding olefine having at least one double bond in the molecule which comprises combining the olefine with water in the vapor state at a temperature of at least 100° C. in the presence of an inorganic acid which contains a metal of the group consisting of cobalt, vanadium, chromium and tungsten in the acid radical.

5. A method of manufacturing alcohol by hydrating the corresponding olefine having at least one double bond in the molecule which comprises combining the olefine with water in the vapor state at a temperature of at least 100° C. in the presence of bismuth vanadate.

6. A method of manufacturing alcohol by hydrating the corresponding olefine having at least one double bond in the molecule which comprises combining the olefine with water in the vapor state at a temperature of at least 100° C. in the presence of silver vanadate.

7. A method of manufacturing alcohol by hydrating the corresponding olefine having at least one double bond in the molecule which comprises combining the olefine with water in the vapor state at a temperature of at least 100° C. in the presence of tungstic acid.

8. A method as set forth in claim 1 in which the reaction is carried out at substantially atmospheric pressure.

9. A method as set forth in claim 1 in which the reaction is carried out at a temperature between 100° C. and about 400° C.

10. A method of manufacturing alcohol by hydrating the corresponding olefine having at least one double bond in the molecule which comprises combining the olefine with water in the vapor phase at a temperature of at least 100° C. in the presence of a metallate containing a metal of the group consisting of cobalt, vanadium, chromium and tungsten in the acid radical.

11. A method of manufacturing alcohol by hydrating the corresponding olefine which comprises heating said olefine with water in the vapor state at a temperature and at a pressure at which hydration of said olefine is effected in the presence of a compound of the class consisting of the inorganic acids and inorganic acid salts which contain a metal of the group consisting of cobalt, vanadium, chromium and tungsten in the acid radical.

12. A method of manufacturing alcohol by hydrating the corresponding olefine which comprises heating said olefine with water in the vapor state at a temperature and at a pressure at which hydration of said olefine is effected in the presence of a metal vanadate which does not yield the metal under reaction conditions.

ANDRIANUS JOHANNES van PESKI.
SIEGFRIED LEONARD LANGEDIJK.